(12) United States Patent
Zimmerman

(10) Patent No.: US 7,058,814 B1
(45) Date of Patent: Jun. 6, 2006

(54) SYSTEM AND METHOD FOR PROVIDING TIME-LIMITED ACCESS TO PEOPLE, OBJECTS AND SERVICES

(75) Inventor: Thomas Guthrie Zimmerman, Cupertino, CA (US)

(73) Assignee: International Business Machines Corporation, Armonk, NY (US)

(*) Notice: Subject to any disclaimer, the term of this patent is extended or adjusted under 35 U.S.C. 154(b) by 1118 days.

(21) Appl. No.: 09/672,360

(22) Filed: Sep. 28, 2000

(51) Int. Cl.
*H04L 9/00* (2006.01)

(52) U.S. Cl. ...................................... 713/178; 713/501
(58) Field of Classification Search ................ 380/270, 380/36; 713/159, 171, 172, 185, 401, 501, 713/502, 503, 178; 342/357.1, 357.07, 357.08, 342/357.12; 705/32
See application file for complete search history.

(56) References Cited

U.S. PATENT DOCUMENTS

| | | | | |
|---|---|---|---|---|
| 5,168,520 | A | 12/1992 | Weiss | 670/705 |
| 5,202,997 | A | 4/1993 | Arato | 395/725 |
| 5,310,999 | A | 5/1994 | Clauss et al. | 235/384 |
| 5,361,062 | A | 11/1994 | Weiss et al. | 380/825.33 |
| 5,412,379 | A | 5/1995 | Waraksa et al. | 380/825.72 |
| 5,420,925 | A | 5/1995 | Michaels | 380/23 |
| 5,481,265 | A | 1/1996 | Russell | 380/22 |
| 5,485,519 | A | 1/1996 | Weiss | 380/23 |
| 5,629,981 | A | 5/1997 | Nerlikar | 380/25 |
| 5,657,388 | A | 8/1997 | Weiss | 380/23 |
| 5,796,827 | A | 8/1998 | Coppersmith et al. | 380/9 |
| 5,960,085 | A * | 9/1999 | de la Huerga | 340/5.61 |

* cited by examiner

*Primary Examiner*—Gregory Morse
*Assistant Examiner*—Thomas Ho
(74) *Attorney, Agent, or Firm*—Samuel A. Kassatly

(57) ABSTRACT

A limited tracking system and associated method that enable the use of personal encoded identification media to limit access to tracking information. The tracking system provides concurrent time-limited access to a large number of people, objects, information, services, and other resources, and has particular applicability to credit cards, dining cards, telephone calling cards, health cards, driver's licenses, video store cards, car access cards, building access cards, computer access cards, and like identification badges or cards. The tracking system includes a transmitter module incorporated in a badge, and a receiver module incorporated in a secure server. The transmitter module contains an encryptor and a watch crystal that keeps track of time, such that the encryptor encrypts the current time with the user's private key, and periodically transmits the encrypted current time to the receiver module, as a code list. The server stores the private keys of all the users, and, in turn, encrypts the current times of all the badges with the corresponding private keys of the users, to generate an authentication table. An authenticator compares the received code list to the authentication table, seeking matches that are indicative of the validity of the transmitting badges.

20 Claims, 5 Drawing Sheets

SYSTEM AND METHOD FOR PROVIDING TIME-LIMITED ACCESS TO PEOPLE, OBJECTS AND SERVICES

CROSS REFERENCE TO RELATED APPLICATION

The present application is related to co-pending U.S. patent application Ser. No. 09/234,229, titled "System and Method for Optimizing Personal Area Network Electrostatic Communication," which was filed on Jan. 20, 1999, which is assigned to the same assignee as the present invention, and which is incorporated herein by reference in its entirety.

FIELD OF THE INVENTION

The present invention generally relates to the field of electronic communication systems. More specifically, the invention relates to the use of personal encoded identification media for providing time-limited access to people, objects, information, services, and other resources. The invention has particular applicability to credit cards, dining cards; telephone calling cards; health cards; driver's licenses; video store cards; car access cards; computer access cards; building access cards, identification tag; key fob and like ID badges and tokens.

BACKGROUND OF THE INVENTION

The use of electromagnetic fields as a communication medium is ubiquitous in today's society. Both communication over physical media, such as wires, and wireless communication, such as broadcast radio, television and satellite, infrared, and ultrasound, are widespread and commonplace. Such communication may be made over long distances, or over much shorter distances, such as closed-circuit television or a client human being using a terminal to communicate with a local server. Other media may be used for wireless communication, including acoustic such as ultrasonic, sonic, and subsonic, electric field and magnetic field.

In some situations, a user is physically present at a terminal or communication system, for the duration of a transaction. The terminal is available to all interested users, and a user having need of the service provided by the terminal seeks it out and uses it to make the transaction. Examples of such terminals are public pay telephones and Automatic Teller Machines (ATM).

Many transactions involve the use of a portable instrumentality or an input device such as a keypad, for verifying the identity of the user in order to authorize the transaction, make a charge for the service, etc. Often, this portable instrumentality takes the form of a card or badge bearing a magnetically encoded stripe, which is readable by the terminal. For instance, a user seeking cash from an ATM stands before the ATM, inserts his/her card, and keys in a Personal Identification Number (PIN), followed by menu-prompted transaction instructions. Authorization of the transaction is based on a verification of the user's identity based on a combination of (i) the user's possession of the authorizing card, and (ii) the user's knowledge of the PIN.

However, this form of communication could expose the user to physical hazards, and the card to theft and unauthorized access. U.S. Pat. No. 5,796,827 to Coppersmith et al, which is incorporated herein by reference, addressed this problem by providing an apparatus and method for utilizing the human body as a communication medium to transmit information related to the user, to protect the user's privacy and the confidentiality of the information against unauthorized access. The patented communication system produces small currents in the human body, externally induced by electrostatic field coupling, which provides for wireless identification and authentication among proximate devices. The system encrypts data and provides for easy and rapid receipt and authentication of the encrypted data, with sufficient capacity to handle millions of unique transmitter codes.

U.S. Pat. No. 5,657,388 to Weiss describes an attempt at improving the secure access to electronic information by utilizing a token that may contain a public ID, to provide secure access by authorized users to a selected resource. The token stores a secret user code in machine readable form, which code is read by a token processor. The token processor receives a time-varying value and an algorithm, both of which may be stored or generated at either the token or the token processor, and a secret personal identification code which may be inputted at the token or the token processor. The secret user code, time-varying value, and secret personal identification code are then algorithmically combined by the algorithm to generate a one-time nonpredictable code which is transmitted to a host processor. The host processor utilizes the received one-time nonpredictable code to determine if the user is authorized access to the resource and grants access to the resource if the user is determined to be authorized.

However, the systems described in U.S. Pat. No. 5,657,388 and other similar publications still rely on the transmission of a public key or other public ID for proper authentication. The public ID which typically includes a static code value is also subject to surreptitious detection, and can be used to associate a particular user or object with a specific transmission, compromising the user's or object's privacy.

While conventional devices have provided significantly enhanced security for data processing systems, databases and other information resources there still remains an unsatisfied need for a further improved system that eliminates the need for public keys or IDs, thus further minimizing invasion of privacy, security risk and exposure.

As an example, though identification badges that wirelessly transmit an ID code can be used to locate someone in a building, such as to find doctors in a hospital, maintenance people in a factory, or key personnel in an office, individual privacy might be compromised in that the badge users can be tracked all the time without their control or consent. It would therefore be desirable to have a system that limits access to tracking information, such as allowing a badge user to be tracked for limited time periods that are determined by this particular user.

SUMMARY OF THE INVENTION

One feature of the present invention is to provide a limited tracking system and associated method that enable the use of personal encoded identification media to limit access to tracking information.

A more specific feature of the limited tracking system is to provide concurrent time-limited access to a large number of people, objects, information, services, and other resources, which are herein collectively referred to as "resources". The limited tracking system has particular applicability to credit cards, dining cards, telephone calling cards, health cards, driver's licenses, video store cards, car access cards, building access cards, computer access cards, and like identification badges or cards.

For example, the limited tracking system could allow persons to be tracked only during business hours but not during lunch or break times. This will allow privacy of movement during the employee's personal time. Alternatively, the limited tracking system could be automatically tied to events in a person's or group's calendar, to allow tracking during important meetings or phone calls, so that an assistant might try to locate individuals during these important events. The limited tracking system can be included in laptops, desktops or processors, to track assets in buildings.

Another feature of the limited tracking system is to distribute tracking access to multiple sources and limit the vulnerability of a user's or object's privacy if one or more of the sources are compromised.

The foregoing and other objects and features of the present invention are realized by a limited tracking system that includes a transmitter module incorporated in an ID badge, card, or label, and a receiver module incorporated in a secure server. The transmitter module contains a microprocessor and a watch crystal that keeps track of time. The microprocessor encrypts time with a private key, and transmits the encrypted time once every ten seconds. The transmission can be any wireless means, including infrared, radio frequency, electric field, magnetic field, ultrasonics, and so forth. The limited tracking system is capable of individually tracking a large number of receivers that are distributed about one or multiple tracking environments or ranges.

The secure server stores the private keys of all the users (or receivers). The user of the badge can give a third party, or multiple parties, referred to herein as finder, access to the user for specified time periods. As an example, if the user wishes to give the finder tracking access for specific time periods, the user instructs the server to deliver a list of encrypted codes with the user's private key for these time periods. This list can be transmitted or otherwise provided to the finder for storage on the finder's own server. When the finder detects a transmission from the user's badge, the finder's server looks up the current value of the user's badge from the list and compares it to the encrypted code it received from the badge. If a match exists, the finder would have identified and located the user.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF THE INVENTION

Figure 1:
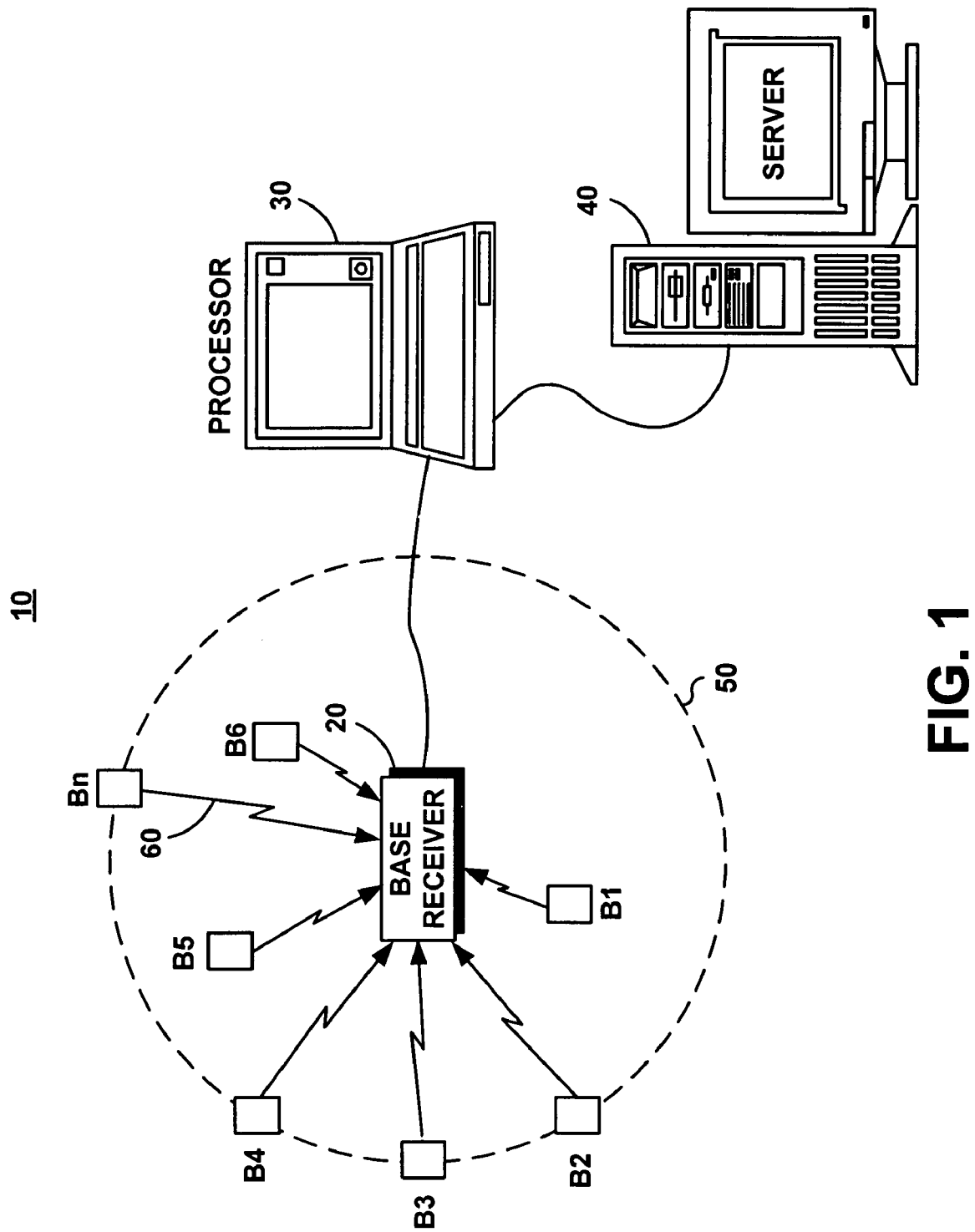
FIG. 1 is a schematic illustration of an exemplary operating environment in which a limited tracking system of the present invention may be used, showing a plurality of badges in communication with a base receiver, a processor, and a server, for access authentication.

FIG. 1 depicts a plurality of badges, cards, persons B1–Bn, hereinafter referred to collectively as either "user (s)" or "badge(s)", each provided with a component of a limited tracking system 10 of the present invention, and shown in communication with a base receiver 20, a processor 30, and a server 40, for time-limited access authentication according to the present invention. It will be understood that numerous other environments may also employ the limited tracking system 10. Such other environments may include, for example, public telephones that accept calling card calls, gas pumps at service stations, photocopy machines, postal meters, and entry through building or automobile doors. Also, the limited tracking system 10 may be used in connection with the computer or processor 30 as a log-in mechanism. In addition, while only one base receiver 20, processor 30, and server 40 are shown for illustration purpose only, it should be clear that additional base receivers 20, processors 30, and/or servers 40 may be used for a decentralized limited tracking system 10.

In operation, each badge B1–Bn generates a temporal sequence of values, encrypts the temporal sequence with a private key associated with the individual badge B1–Bn, and transmits at a predetermined transmission cycle an encrypted code element, for example one every ten seconds In a preferred embodiment a time keeper provides the temporal sequence of values. The resulting encrypted code element, appears to the observer as a random number. As an alternative, the encryption and transmission can be initiated by mechanical means, such as a electrical switch on the badge, or a motion detector. For example, each time the switch is pressed, an encrypted code element is calculated and transmitted. As one (or more) badge B1–Bn enters a communication zone 50, denoted by a circle in dashed line, associated with the base receiver 20, the encrypted code for that badge is transmitted to the base receiver 20 over a communication link 60. The transmission can be any wireless means, including infrared, radio frequency, electric field, magnetic field, ultrasonic, and so forth. The transmission can also be by contact, such as a smart card, or by physical contact as described, for example, in U.S. Pat. No. 5,796,827 to Coppersmith et al, which is incorporated herein by reference. Alternatively, at least a part of the transmission link 60 is wireless. The limited tracking system 10 is capable of individually tracking a large number of badges B1–Bn that are distributed about a tracking environment or communication zone 50.

In accordance with the present invention, the communication between the badges B1–Bn and the base receiver 20 is encrypted to establish authentication and security. A preferred technique of encryption is described in detail below. Also, if the user carries multiple badges (i.e., transmitters), such as instrumentalities embedded in cards, a watch, or shoes, these badges may be detected separately for authentication.

In accordance with the present invention, and as illustrated in FIG. 1, a badge Bn transmitter and a base receiver 20 work in combination to provide unidirectional communication. For bidirectional communication, the badge Bn can be provided with a receiver, and the processor 30 can be provided with a receiver. For a unidirectional badge Bn, time is the challenge, and time encrypted by the private key is the response. For a bi-directional communication, the base receiver 20 includes a transmitter which transmits a challenge to the badge Bn. The badge Bn encrypts the challenge by the private key and transmits the response to the base receiver 20.

Figure 2:
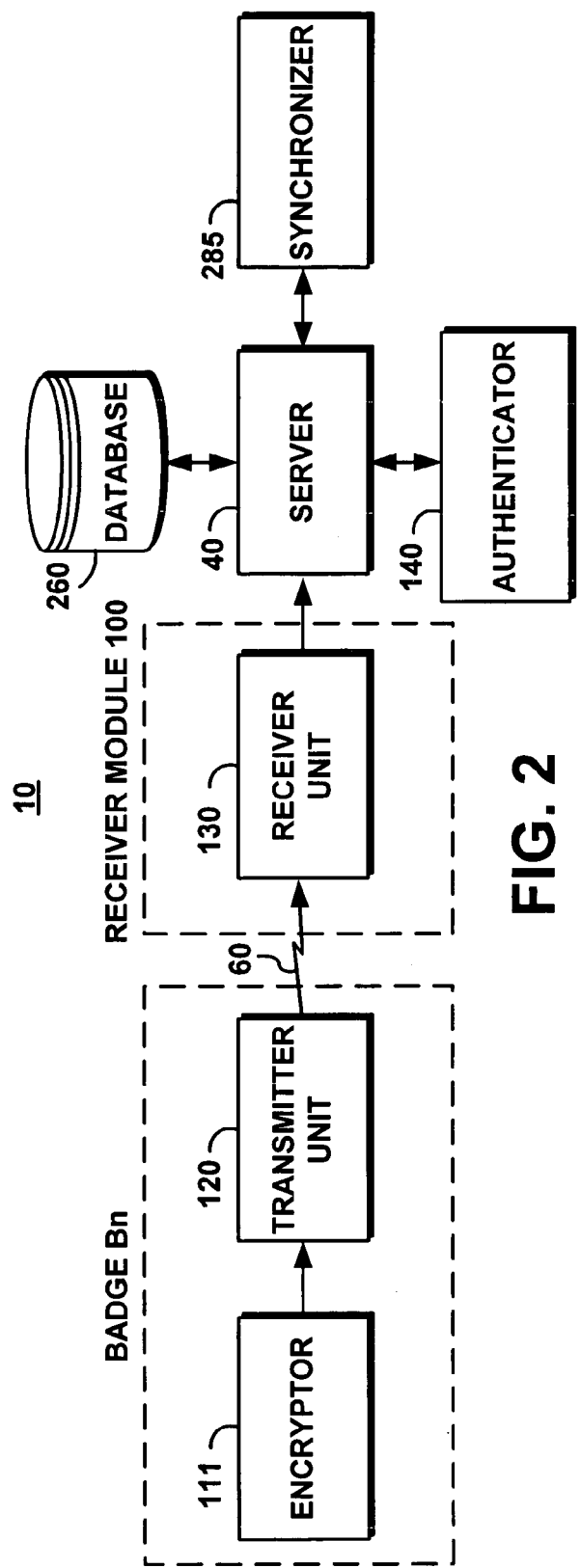
FIG. 2 is a high level functional block diagram of an exemplary badge Bn shown in communication with a receiver module that forms part of the base receiver of FIG. 1.
Figure 3:
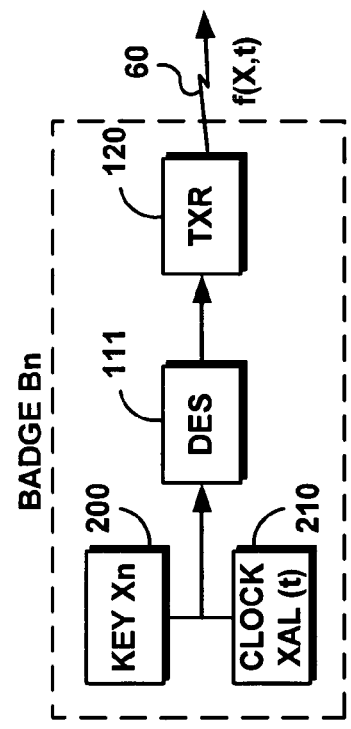
FIG. 3 is a high level functional block diagram of an exemplary badge Bn.

FIGS. 2 and 3 are block diagrams of two preferred embodiments of the limited tracking system 10 of the present invention. Unidirectional communication takes place between a badge Bn, and a receiver module 100 that forms part of the base receiver 20. The limited tracking system 10 supports a scenario in which the badge Bn continuously, or at regular intervals such as every ten seconds, transmits an encrypted code as described herein.

The badge Bn generally includes an encryptor 111 that generates an encrypted code based on a private key (or a user ID) dedicated to the badge Bn and a time representation. The resultant encrypted code can optionally be modulated using a modulator, known to the art of digital communication, such as amplitude modulation, frequency modulation, and spread spectrum (not shown) and transmitted to the receiver module 100 by means of a transmitter unit 120.

The receiver module 100 is coupled to the communication link 60 for receiving the encrypted code. To this end, the receiver module 100 includes a receiver unit 130 that receives the encrypted code and optionally demodulates it. The received encrypted code is then passed to the server 40. The server 40 includes an authenticator 140 that authenticates the signal as described in detail below, and provides the information to an application such as a program for confirming the presence of the badge Bn.

The server 40 uniquely identifies the user or the badge Bn, rejecting attempts at impersonation. A sample application would be a unique ID card for a population of several hundred (i.e., 500) employees working in a building, each of whom using a badge for access to the building and/or other services.

With reference to FIG. 3, each user or badge Bn has a unique private key or ID Xn (also reference by the numeral 200), represented by a bit-string, typically of length 56 or 128 bits. At ten-second intervals as measured by a clock crystal 210, the badge Bn transmits a signal f(X,t) (represented as a bit-string), where f( ) is an encryption function which is computed by the encryptor 111, Xn is the user's unique private key, and t is the time (in seconds) measured, for example, from an initial synchronized starting point of the badge Bn.

According to another embodiment, a network of base receivers 20 can be dispersed in a geographic area to track the whereabouts of the badges B1–Bn.

When the badge Bn enters the communication zone 50, the limited tracking system 10 attempts to discover the identity of the Bn. The receiver unit 130 (FIG. 2) receives the encrypted code, and sends the encrypted code to the server 40. In turn, the server 40 sends the encrypted code to the authenticator 140. The authenticator 140 creates an authentication table composed of pre-calculated encryptions for every expected badge Bn for the current time. Upon receiving an encrypted code, the authenticator 140 attempts to find the encrypted code in the authentication table. In a preferred embodiment, an identification number, private key Xn, and offset time value (to be described later) of every badge Bn is stored in a database 260. The authenticator 140 checks whether or not the decrypted signal matches authenticating codes that are stored in the database 260 of the server 40, for this particular badge Bn, during a specified time window, that generally corresponds to the badge's entry into the communication zone 50. If the encrypted code is in the authentication table, the authenticator 140 sends the badge Bn identification number back to the server 40, else it sends a "not found" message to the server 40.

It should be noted that the signal or code transmitted by the badge Bn, includes the badge's time encrypted by the private key Xn, but does not include a public ID as was taught by conventional tracking systems. As a result, the encrypted code transmitted by the badge Bn can only be decrypted by a private, non-public key which is available only to the server 40 and to the badge Bn.

Time increments, and the encryption of time, produce a random sequence of numbers that are transmitted. Because the badge Bn sends out what appears to be random numbers, an eavesdropper would see gibberish (random numbers) which would not reveal any information about the carrier of the badge Bn. It is only when these numbers are sent to the authenticator 140 that they are linked with a service, such as an ATM, drivers license, calling card, etc. Detecting the transmission of the badge Bn does not reveal the identity of the user, nor can a relation be made between a current transmission and previous ones, without knowledge of the private key. In this way, anonymousity of the user is maintained.

Referring to FIG. 3, the badge Bn contains a clock 210, private key Xn 200, encryptor 111, and wireless transmitter 120. The clock 210 provides the current time, and includes a time reference, preferably a quartz crystal oscillating at 31.768 kHz. In a preferred embodiment, the current time is the elapsed time in seconds since the badge Bn was manufactured. The encryptor 111 in the badge Bn uses an encryption that can be, for example, the well-known Data Encryption Standard (DES). The encryptor 111 periodically encrypts time (t) with the private key Xn 200, and transmits the result using the transmitter 120.

Figure 4:
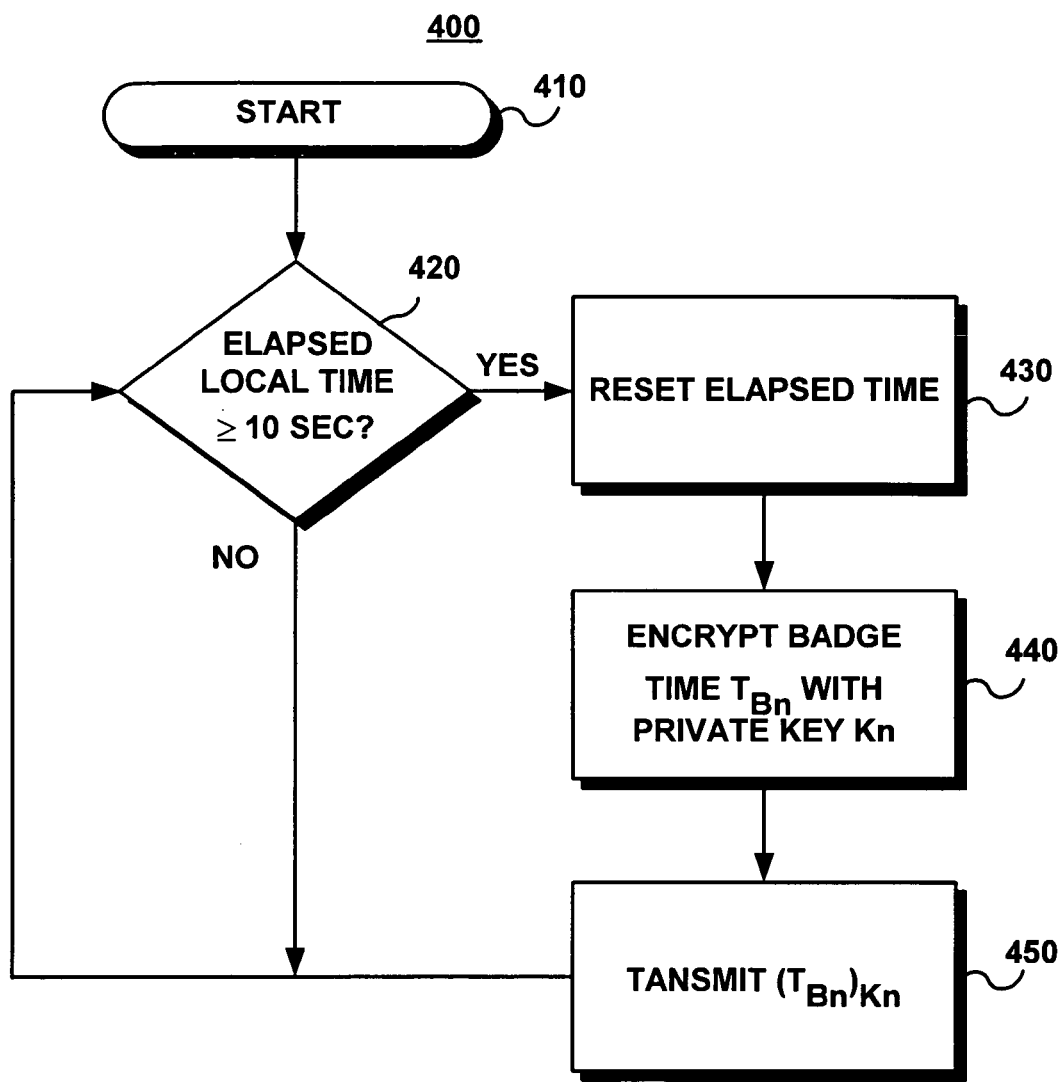
FIG. 4 is a flow chart illustrating an exemplary encryption process implemented by the badge of FIG. 3 according to the present invention, for transmitting an encrypted code specific to each badge.

Referring to the flow chart of FIG. 4, it illustrates an exemplary encryption and transmission method 400 implemented by the badge Bn according to the present invention. The method 400 starts at step 410 and inquires at decision step 420 if a predetermined period of time (i.e. the predetermined transmission cycle), such as 10 seconds, has elapsed since the last transmission by the badge Bn. If the elapsed time still has not exceeded the predetermined period, the method 400 returns to decision step 420 and repeats the inquiry until the elapsed time exceeds the set time period. At which stage, the method 400 proceeds to step 430 where it resets the elapsed time interval.

The method 400 then proceeds to step 440 where the DES encryptor 111 of FIG. 3 encrypts the time for the badge Bn by the user's private key Xn, as can be represented by the following expression:

$$f(Xn,t)=(T_{Bn})_{Kn},$$

where $(T_{Bn})$ represents the time for the badge, Kn represents the private Key for the badge Bn, and where n varies in the above example from 1 badge to 500 badges.

At step 450 the transmitter unit 120 transmits the encrypted code $(T_{Bn})_{Kn}$ to the receiver module 100 and the server 40, and then returns to decision step 420 for repeating steps 430–450. As it will be described in connection with FIG. 5, the receiver module 100 and the server 40 receive and authenticate the encrypted code $(T_{Bn})_{Kn}$. The server 40 then looks up the private key Xn that has generated the encrypted code $(T_{Bn})_{Kn}$, and from this private key Xn, the server 40 identifies the badge Bn. In one implementation, the badge Bn requires about 96 bits of RAM to implement the DES encryption, another 64 bits for the time tn, and a few thousand bits of ROM for the DES encryption. Faster implementations of DES would require for example approximately 32K bits of ROM.

Figure 5:
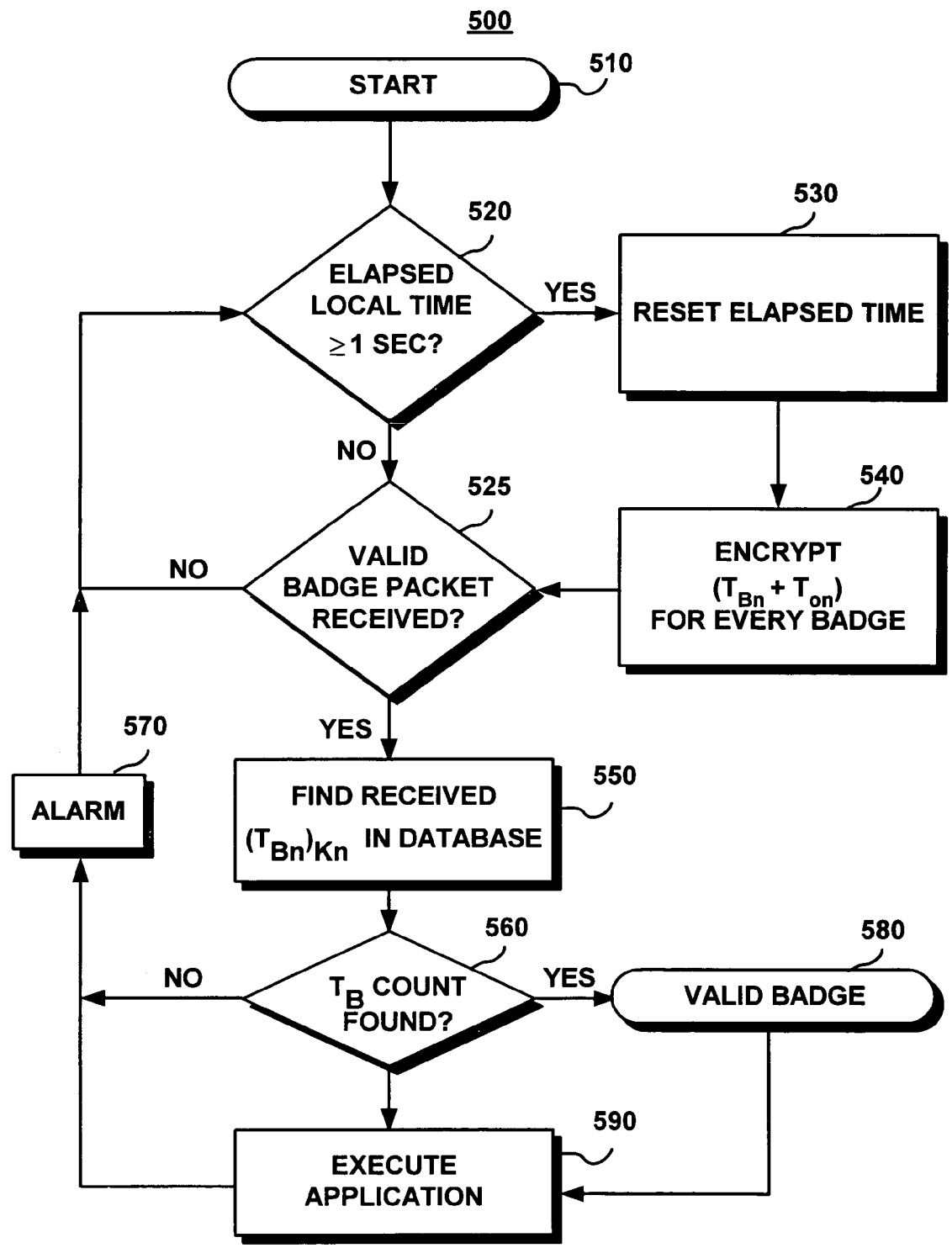
FIG. 5 is a flow chart illustrating an exemplary access authentication process implemented by either the processor of FIG. 2, or the local processor, the remote processor and/or the server of FIG. 3, for authenticating the encrypted code transmitted by the badge according to the process of FIG. 4.

Referring now to FIG. 5, it illustrates an exemplary access authentication method 500 which is implemented by either the processor 30 of FIG. 2 for authenticating the encrypted code $(T_{Bn})_{Kn}$ transmitted by the badge Bn. The authentication method 500 starts at step 510 and inquires at decision step 420 if a predetermined period of time, such as 1 second, has elapsed since the last reception cycle. In a preferred embodiment the temporal resolution of the authentication table, determined by the period at step 520 of FIG. 5 should be equal to, or greater than the predetermined transmission cycle 420 of FIG. 4, so the authenticator 140 has equal or greater temporal resolution than the badges Bn.

If the authentication method 500 determines at the decision step 520 that the elapsed time still has not exceeded the predetermined period, the method 500 determines at decision step 525 if a valid badge packet has been received. To this end, the packet transmitted by the badge Bn typically includes three fields: a preamble field, a payload field, and a checksum field.

The preamble contains data bits indicating that the packet is originating from a valid badge, or otherwise a badge associated with the limited tracking system 10. This precautionary measure allows the limited tracking system 10 to filter out transmissions, noise, or otherwise irrelevant signals, and to process only related signals. The payload field contains the encrypted code $(T_{Bn})_{Kn}$ described earlier, which will eventually be processed by the receiver module 100 for badge authentication. The checksum field provides means for checking the integrity of the transmission.

If the authentication method 500 determines at the decision step 525 that the received packet is not a valid badge packet, by for example analyzing the preamble field content or the checksum is not correct, the method 500 ignores the packet and returns to the decision step 520, where it repeats the inquiry until the elapsed time exceeds the set time period.

At this stage, the method 500 proceeds to step 530 where the elapsed time count is reset. The method 500 then proceeds to step 540 and encrypts the sum of the current time badge Bn time $(T_{Bn})$ and offset time value $(T_{on})$ with respect to the private key Xn for all the valid the badges B1–Bn, as represented by the following expression:

$$En=(T_{Bn}+T_{on})_{Kn},$$

where $T_{on}$ is the offset time or time drift for each badge Bn which will be explained in the next paragraphs, En is the encrypted result for badge n, $T_{Bn}$ is the time for badge n, Kn is the key for badge n, and $T_{on}$ is the time drift for badge n. Initially, Ton is set to zero the first time it is detected, and is modified based on successive authentications of the badge Bn.

Since the badge Bn does not transmit the time, the current time badge Bn time $(T_{Bn})$ is calculated by the authenticator 140 by the following expression;

$$(T_{Bn})=T_{system}-T_{badge\ n\ creation}$$

where $T_{system}$ is the current server 40 system time in seconds and $T_{badge\ n\ creation}$ is the time the badge Bn was created, referenced to the same time standard as $T_{system}$. The $T_{badge\ n\ creation}$ for each badge Bn is stored on the database 260.

One problem addressed by the present invention is time drift that develops between the badge Bn and the authenticator 140. There are generally two main causes for the time drift: (a) systematic, the time reference of a particular badge Bn is faster or slower than the authenticator 140; and (b) random, the time reference of a particular badge Bn usually varies due to temperature or other environmental changes.

The first cause is predictable, and in a preferred embodiment the authenticator 140 calculates the frequency of each badge B1–Bn from successive authentications. Time drifts due to temperature changes are usually minimal, since the badge Bn is typically kept with a person at room temperature. The stability of practical time references are demonstrated by the time keeping ability of inexpensive digital watches that can maintain time to within a few minutes per year.

Another feature of the present invention is the establishment of a window of tolerance (also referred to as a clock synchronization window, drift window, or temporal tolerance window) for the encrypted result, En, in order to allow authentication in the presence of time drift. Since the clocks 210 (FIG. 3) of the badges B1–Bn and the clock at the server 40 cannot be expected to remain in perfect synchrony, the server 40 allows a clock synchronization window within which authentication would proceed.

According to one embodiment, the server 40 allows authentication within a "drift window" centered around the time $T_{Bn}$ of the badge Bn, as shown by the following expressions:

$$En1=(T_{Bn}+T_{on})_{Kn},$$

$$En2=(T_{Bn}+T_{on}-Epsilon)_{Kn},\ and$$

$$En3=(T_{Bn}+T_{on}+Epsilon)_{Kn},$$

where Epsilon is the transmission cycle.

In this embodiment, En1 is the encrypted results when the badge Bn is in synchrony with the server 40 (to within +/− one half of a transmission cycle). En2 is the encrypted results when the badge Bn lags the server 40 by one transmission cycle (+/− on half a transmission cycle). En3 is the encrypted results when the badge Bn leads the server 40 by one transmission cycle (+/− on half a transmission cycle). In this example, the drift window is 2 transmission cycles, that is the badge Bn can lead or lag the server 40 by one transmission cycle. In this example, and in the preferred embodiment, the temporal resolution (increment size) of the temporal sequence of values generated in the badge Bn is equal to the transmission cycle.

As stated earlier, the intially $T_{on}$ is set to zero on the first read of the Badge Bn by the server 40, and is modified based on successive authentications of the badge Bn. If the badge Bn authenticates with E1, $T_{on}$ remains the same. If the badge Bn authenticates with E2, $T_{on}$ is decremented ($T_{on}=T_{on}-1$). If the badge Bn authenticates with E3, $T_{on}$ is incremented ($T_{on}=T_{on}+1$). By this method, the authenticator 140 tracks drift in the badge Bn clock 210, preventing the drift from accumulating and preventing authentication. A more sophisticated method of correcting for drift is to observe the drift over time, calculate the slope of drift, store the slope for each badge Bn, and calculate $T_{on}$ based on the slope of drift. This would compensate for systematic drift in the badge, i.e. the time reference of a particular badge Bn is faster or slower than the authenticator 140;

A typical exemplary value for the synchronization window can be approximately 20 seconds. This function is implemented by a synchronizer 285 at the server 40 (FIG. 2).

Upon completion of the encryption of step 540, the authentication method 500 proceeds to decision step 525 and checks the validity of the received packet as explained earlier. If at step 525 it is determined that the received packet has originated from a valid badge Bn, it proceeds to step 550 where it looks up the received encrypted code $(T_{Bn})_{Kn}$ in the server database 260.

The server 40 then inquires at step 560 whether the encrypted code $(T_{Bn})_{Kn}$ is found in the database 260. If the encrypted code $(T_{Bn})_{Kn}$ is not found, the server 40 generates an alarm, whether visual or audible, advising the badge user of the procedure to follow to have the situation corrected. For example, the server 40 can advise the badge user to proceed to the security office to have the badge clock 210 resynchronized, by changing the badge's Ton entry in the database 260, or to provide permission to the service or access requested.

If, on the other hand, the encrypted code $(T_{Bn})_{Kn}$ is located in the database 260, the server 40 authenticates and identifies the badge Bn at step 580. Once the badge Bn is authenticated, the server 40 can execute an application at step 590, or alternatively, it can instruct the local processor 240 (FIG. 3) to execute the application. Exemplary applications include: allowing access to the building, logging on to a network, gaining access to a car, or dangerous piece of equipment like a medical machine that administers radiation, hydraulic pressing for stamping car doors, medical cabinets for dispensing narcotics, registers for dispensing cash, guns for shooting bullets, and so forth.

Figure 6:
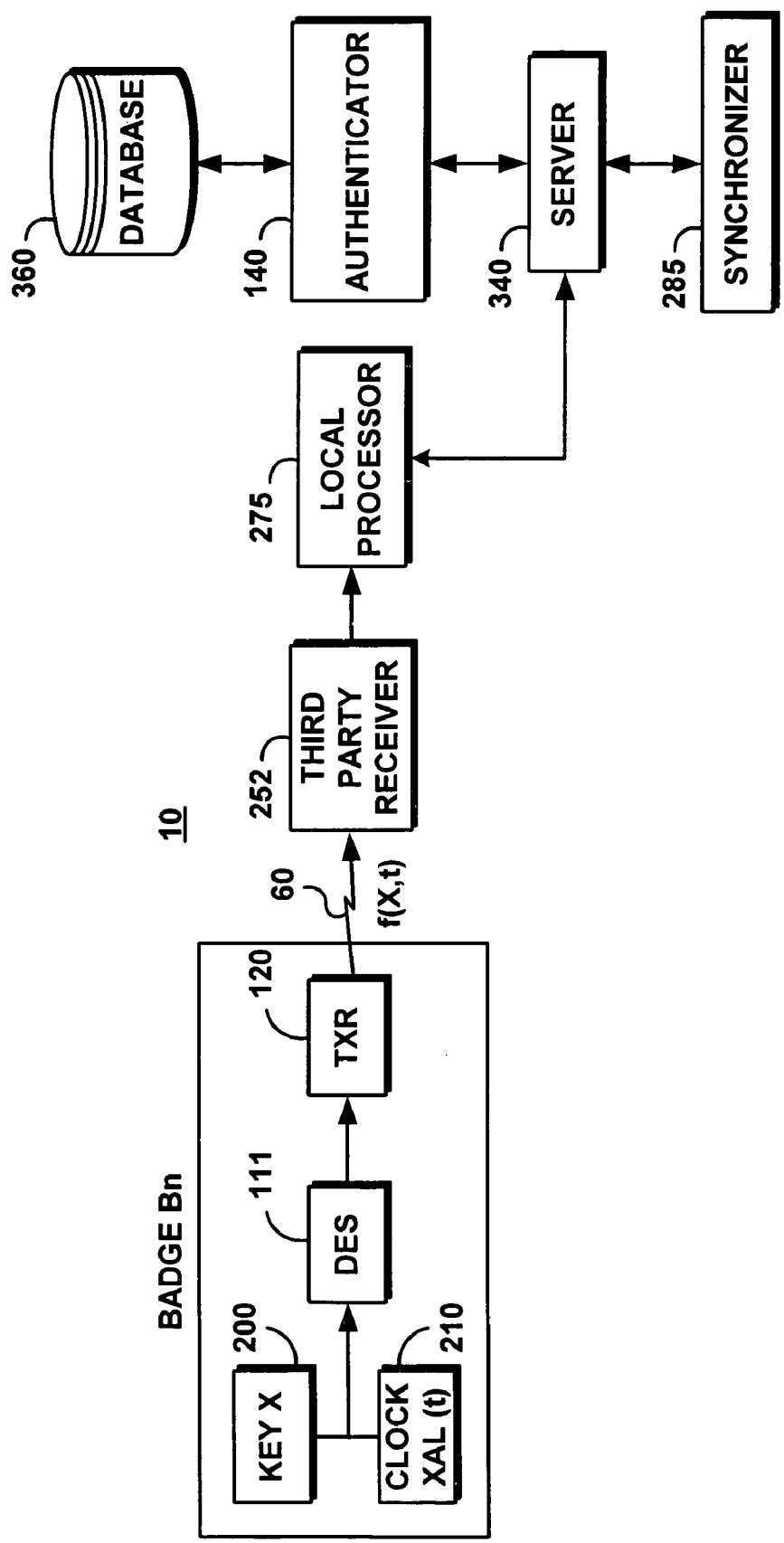
FIG. 6 is a high level functional block diagram of an exemplary badge Bn shown in communication with a third party receiver and the receiver module of limited tracking system of FIGS. 2 and 3.

FIG. 6 describes a specific implementation of the limited tracking system 10. Either the processor 30 (FIG. 1) or the secure server 40 stores the private keys Kn of all the badges B1–Bn. The private keys Kn are not available to the third party as represented by block 252.

The user of the badge, e.g. badge Bn, can give the third party, also referred to herein as finder, access to the user's encrypted codes for specified time periods. To this end, the badge (Bn) user, using the processor 30 (FIG. 1) instructs the server 40 to deliver a list of encrypted codes, i.e., a list of the times encrypted with the user's private key, for specific time periods, to the third party's local processor 275.

The code list can be transmitted or otherwise provided to the finder, i.e., local processor 275 for storage on the local processor 275 for local autonomous authentication, or to the finder's own server 340 and database 360 for networked authentication. When the third party receiver 252 detects a transmission from the user's badge Bn, the third party receiver 252 sends the encrypted code to the local processor 275. If authentication is to take place locally, local processor 275 compares the encrypted code it received from the badge Bn to the code list stored in its internal memory (for example hard drive) indexed by the current time. The local processor 275 can keep time using an internal clock, or externally receive accurate time, for example from a trusted site on the internet. If a match exists, the third party local processor 275 confirms the detection of the user's (or badge Bn) location, for example giving the user access to the resources of local processor 252, including data and applications on the local hard drive.

In the example of networked authentication, the local processor 275 receives the encrypted code from the third party receiver 252 and sends it to the server 340. The server compares the encrypted code to the code list indexed by time. If a match exists, the server 340 sends a message confirming the detection of the badge Bn to the local processor 275. If no match exists, the server 340 sends a denying message to the server 340, that for example will prevent access to local processor 275 resources.

A more specific example of the use of the limited tracking system 10 of FIG. 6 is as follows: A user provides the local processor 275 with a list of encrypted codes that reflects the time periods during which tracking would be allowed, for example, from 12:00 PM to 1:30 PM weekdays. At 12:00:00 PM on Tuesday, the user's badge Bn transmits the code 3948573, while within the communication zone 50, and at 12:00:10 PM it transmits the code 93874832. The badge Bn continues to transmit updated encrypted codes periodically. The code list provided to the local processor 275 contains only valid entries or codes (i.e., 3948573, 93874832, etc.) for the time periods the user has specified, to grant selective and limited access, at these particular times, and not complete access independent of time.

It is to be understood that the specific embodiments that have been described herein are merely illustrative of certain applications of the principle of the present invention. Numerous modifications may be made without departing from the spirit and scope of the present invention.

What is claimed is:

1. An identification system for use with an identification medium to provide time-limit access to a resource, comprising:
   a transmitter module secured to the identification medium;
   a receiver module in selective communication with the transmitter module;
   the transmitter module including an encryptor and a time generator that generates a temporal sequence of values $(T_{Bn})$, wherein the encryptor encrypts the temporal sequence of values $(T_{Bn})$ with a private, non-public key $K_n$ which is unique to the identification medium, to generate a code list composed of encrypted code elements $(T_{Bn})K_n$;
   wherein the transmitter module transmits one or more encrypted code elements $(T_{Bn})K_n$ to the receiver module;
   an authenticator in communication with the receiver module that has access to a subset of the encrypted code elements of the code list; and
   wherein the subset corresponds to a specific time window during which access to the resource is authorized, so that the authenticator is capable of authenticating the identification medium without resorting to the private key, and only during the specific time window corresponding to the subset of the encrypted code elements, by mapping the subset of the encrypted code elements (TBn)Kn, in order to enable time-limited access to the resource during the specific time window.

2. The identification system according to claim 1, for use with a plurality of identification media, each identification medium including a transmitter module and a unique private key for transmitting at least one or more of the encrypted code elements $(T_{Bn})K_n$ to the receiver module for authentication.

3. The identification system according to claim 2, further comprising a storage for storing the private keys of the plurality of identification media.

4. The identification system according to claim 3, wherein the receiver module provides unidirectional communication with at least one of the plurality of identification media.

5. The identification system according to claim 3, wherein upon authenticating the identification medium, the authenticator provides authentication information to an application for initiating the application.

6. The identification system according to claim 3, wherein the temporal sequence of values is measured from an initial synchronized starting point of each identification medium.

7. The identification system according to claim 1, wherein the temporal sequence of values is incremented in substantially equal time increments.

8. The identification system according to claim 1, wherein the encryptor encrypts the temporal sequence of values ($T_{Bn}$) and an offset time value ($T_{on}$) for each identification medium with a corresponding unique private key $K_n$ to generate a list of authentication codes, En, as represented by the following expression:

$$En = (T_{Bn} + T_{on})_{Kn}.$$

9. The identification system according to claim 8, wherein the transmitter module transmits at least one encrypted code element to the receiver module as a packet; and
wherein the packet includes three fields: a preamble field, a payload field, and a checksum field.

10. The identification system according to claim 9, wherein the preamble field contains data bits indicating that the packet is originating from a valid identification medium;
the payload field contains an encrypted code element $(T_{Bn})K_n$; and
wherein the checksum field allows for checking transmission integrity.

11. The identification system according to claim 8, wherein the temporal sequence of values ($T_{Bn}$) is represented by the following expression;

$$(T_{Bn}) = T_{system} - T_{n\ creation},$$

where $T_{system}$ represents current time for a server, and $T_{n\ creation}$ represents a creation time of the identification medium referenced to a same time standard as $T_{system}$;
and wherein the server stores $T_{n\ creation}$ for each identification medium.

12. The identification system according to claim 11, wherein the server establishes a clock synchronization window for the list of authentication codes, En, to account for time drift between the current time of the identification medium and a current time of the server.

13. The identification system according to claim 12, wherein the clock synchronization window is centered around the current time ($T_{Bn}$) of the identification medium, as shown by the following expressions:

$$En1 = (T_{Bn} + T_{on})_{Kn},$$

$$En2 = (T_{Bn} + T_{on} - \text{Epsilon})_{Kn},\text{ and}$$

$$En3 = (T_{Bn} + T_{on} + \text{Epsilon})_{Kn},$$

wherein En1 is the authentication code when the identification medium is in general synchrony with the server;
wherein En2 is the authentication code when the identification medium lags the server; and
wherein En3 is the authentication code when the identification medium leads the server;
wherein Epilson is the resolution of the temporal sequence of values ($T_{Bn}$).

14. The identification system according to claim 1, wherein the transmitter module is incorporated in any one or more of:
an identification badge, a card, and a label.

15. The identification system according to claim 14, wherein the identification medium includes any one or more of: a credit card, a dining card; a telephone calling card; a health card; a driver's license; a video store card; a car access card; a computer access card; or a building access card; an identification tag, a key fob.

16. The identification system according to claim 1, further comprising a server that stores the private key.

17. The identification system according to claim 1, further comprising a local processor that stores the private key.

18. The identification system according to claim 1, wherein the receiver module is secured to the identification medium.

19. An identification system for use with an identification medium to provide time-limit access to a resource, comprising:
a transmitter module in communication with the identification medium;
a receiver module in selective communication with the transmitter module, for transmitting challenge values to the transmitter module;
the transmitter module including an encryptor and a time generator that generates a temporal sequence of values ($T_{Bn}$), wherein the encryptor encrypts the challenge values with a private key $K_n$ which is unique to the identification medium, to generate a code list composed of the encrypted challenge values;
wherein the transmitter module transmits at least a part of the code list to the receiver module;
an authenticator in communication with the receiver module that has access to a subset of the encrypted challenge values; and
wherein the subset corresponds to a specific time window during which access to the resource is authorized, so that the authenticator is capable of authenticating the identification medium without resorting to the private key, and only during the specific time window corresponding to the subset of the encrypted challenge values, by mapping the subset of the encrypted challenge values, in order to enable time-limited access to the resource during the specific time window.

20. An identification system for use with an identification medium to provide time-limit access to a resource, comprising:
a transmitter module in communication with the identification medium;
a receiver module in selective communication with the transmitter module, wherein the transmitter module transmits a sequence of time varying values to the receiver module;
a local processor in communication with the receiver module, includes an encryptor and a time generator that generates a temporal sequence of values ($T_{Bn}$), wherein the encryptor encrypts the time varying values with a private key $K_n$ which is unique to the identification medium, to generate a code list composed of the encrypted time varying values;
an authenticator in communication with the receiver module that has access to a subset of the encrypted time varying values; and
wherein the subset corresponds to a specific time window during which access to the resource is authorized, so that the authenticator is capable of authenticating the identification medium without resorting to the private key, and only during the specific time window corresponding to the subset of the encrypted time varying values, by mapping the subset of the encrypted time varying values, in order to enable time-limited access to the resource during the specific time window.

* * * * *